Aug. 21, 1934.  C. F. SEIBERT ET AL  1,970,674
VEHICLE TREATING DEVICE
Filed Jan. 17, 1929  4 Sheets-Sheet 4
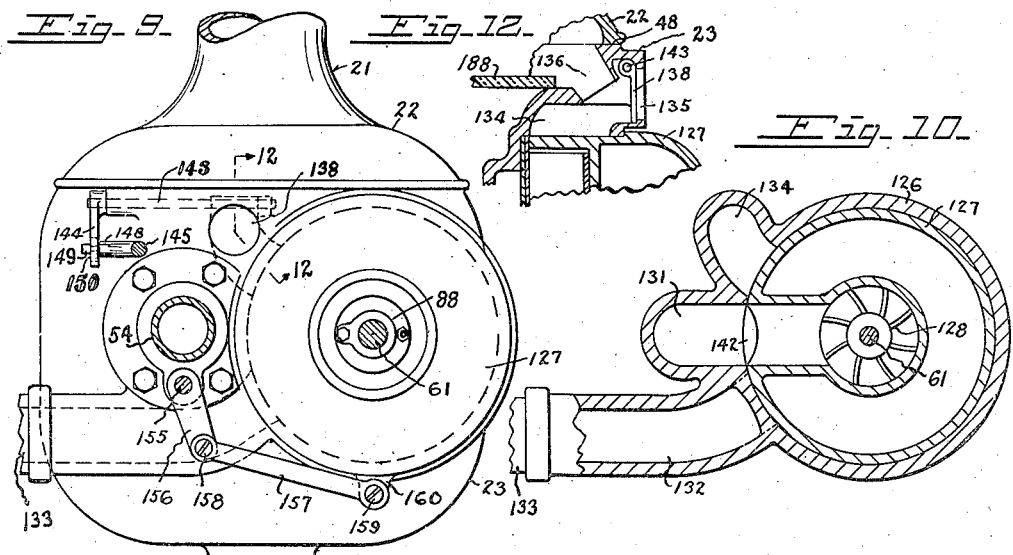
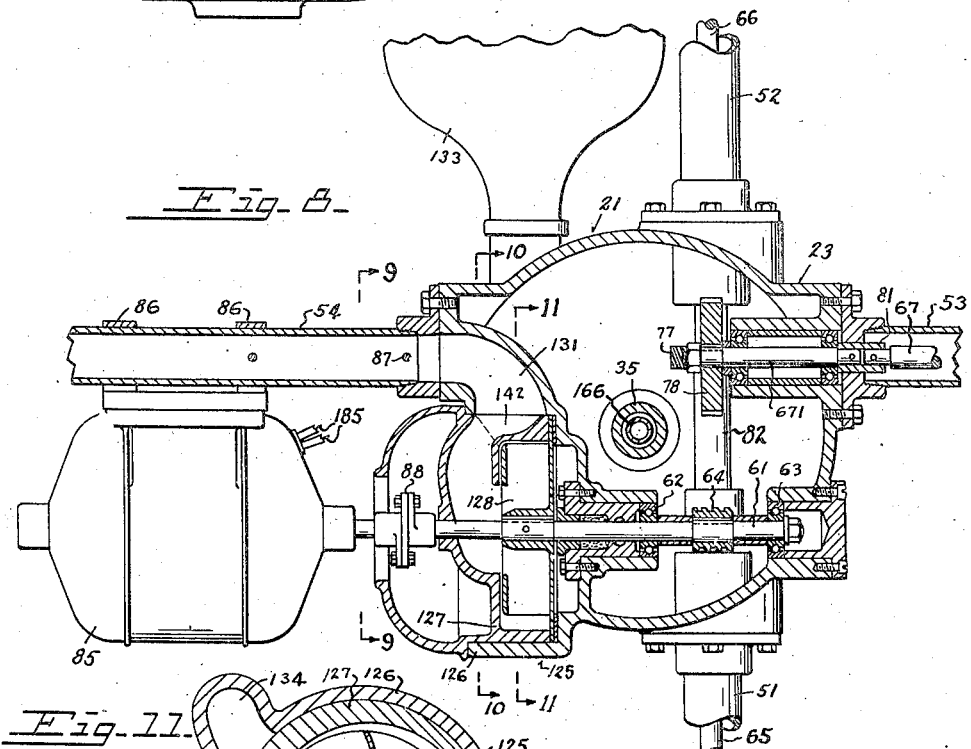
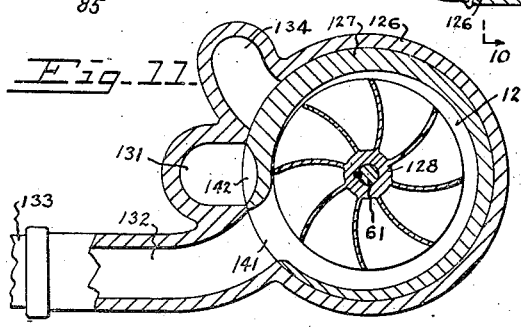
INVENTORS:

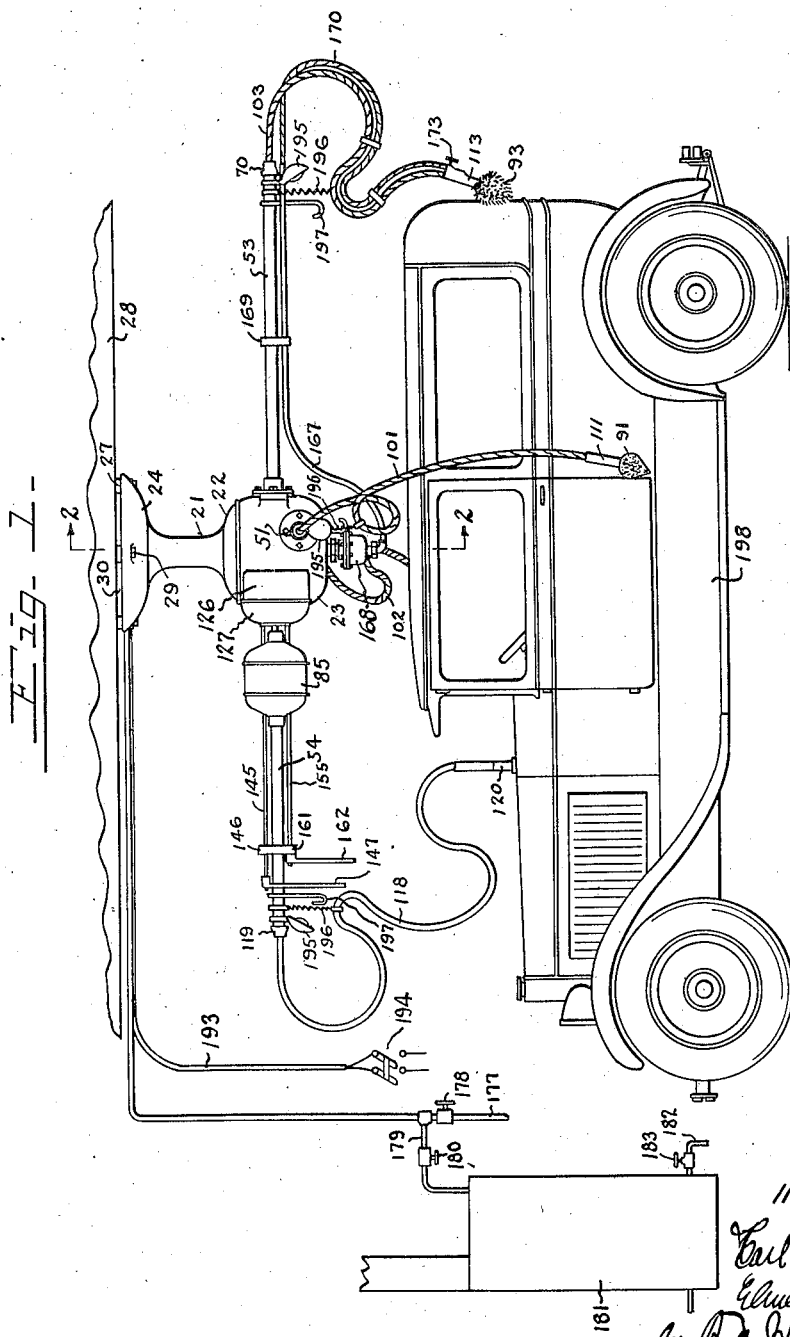

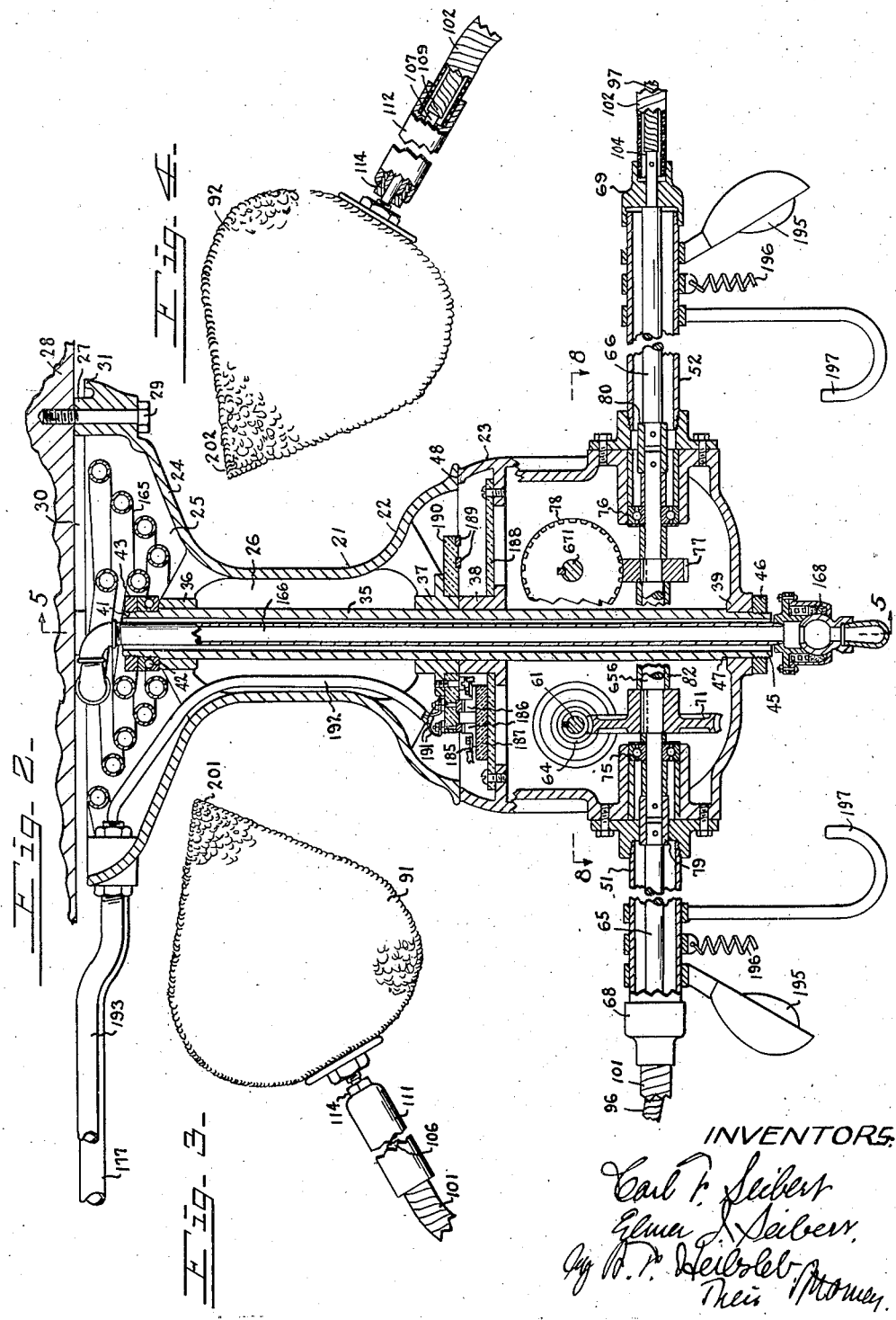

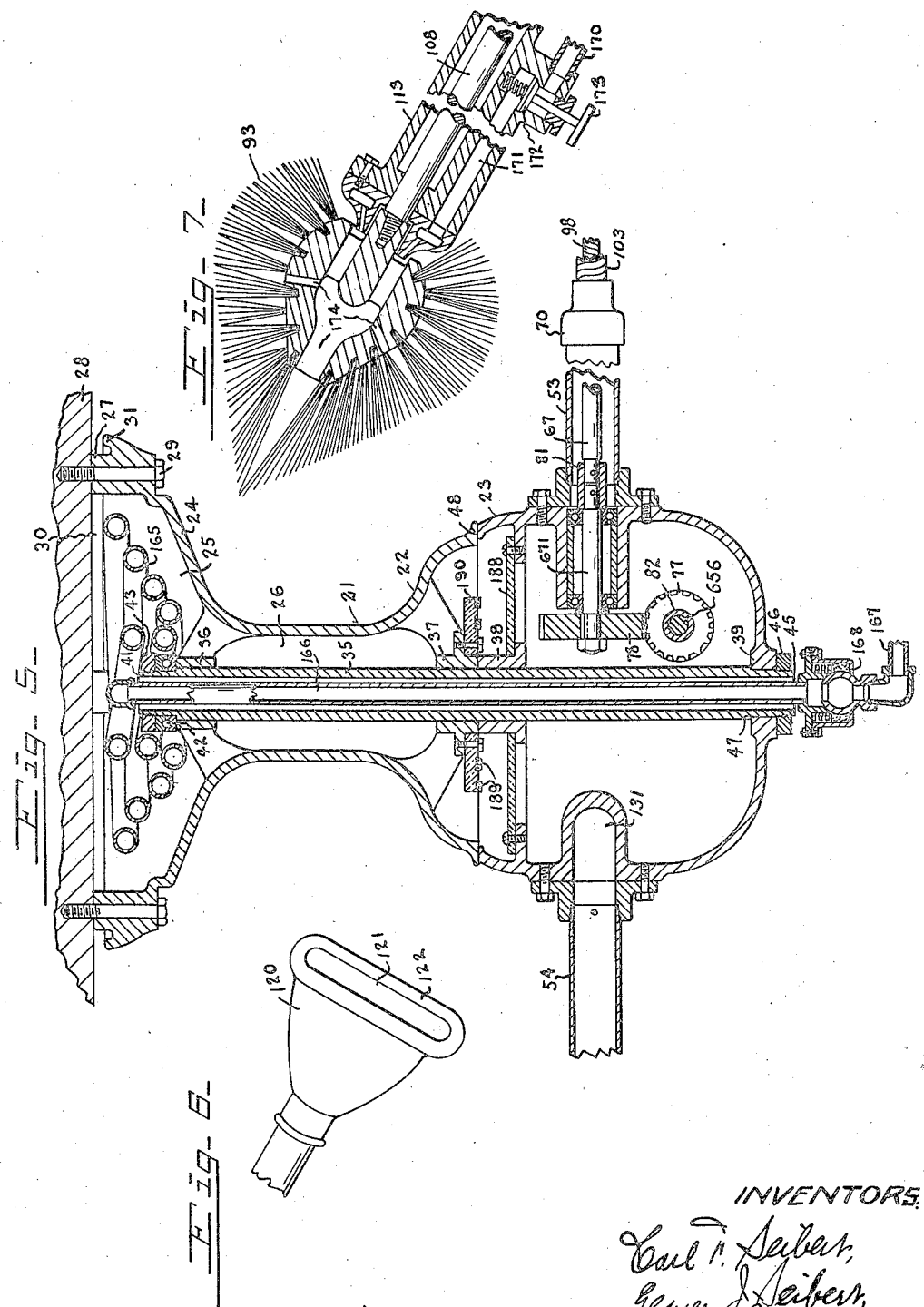

Patented Aug. 21, 1934

1,970,674

UNITED STATES PATENT OFFICE 1,970,674

VEHICLE TREATING DEVICE

Carl F. Seibert, Hamilton, and Elmer J. Seibert, Cincinnati, Ohio

Application January 17, 1929, Serial No. 333,189

2 Claims. (Cl. 15—2)

It is the object of our invention to provide novel means whereby a vehicle may be readily cleaned and have various operations performed thereon for reconditioning the appearance, finish or surface of the vehicle. The vehicle is hereinafter referred to as an automobile.

It is the object of my invention further to provide novel means whereby the automobile may be washed, dried, a finishing material applied to its surface, and the surface polished, or have one or more of said operations performed thereon; further, to provide novel arrangement of means whereby the water for washing may be heated; further, to provide novel means whereby an air current, which may, if desired, be a heated air current, is applied to the automobile; further, to provide novel means whereby the direction of the air current is changed, so as to act either as a blower upon the automobile or with suction away from the automobile; further, to provide a novel rotatable support with arms extending in various directions and supporting rotatable shafts, the outer ends of which are flexible, an air-pipe, the outer end which is flexible, and a water pipe having an outer flexible end; further, to provide novel means for rotating the shafts, novel means for controlling the directions of the air currents, and novel means for heating the air currents.

The invention will be further readily understood from the following description and claims, and from the drawings, in which latter:

Fig. 1 is a side elevation of our improved device illustrating its mode of use in connection with an automobile.

Fig. 2 is a vertical axial section of our improved device, partly broken away, taken on the line 2—2 of Fig. 1.

Fig. 3 is a side elevation of the finish applying head and the connections therefor, the latter partly broken away.

Fig. 4 is a similar view of the polishing head, the connections being partly in section.

Fig. 5 is a vertical axial section of our improved device, partly broken away, taken in the plane of the line 5—5 of Fig. 2.

Fig. 6 is a perspective view of the blower head, the connection thereof being partly broken away.

Fig. 7 is an axial section of the rotary brush head and its connections.

Fig. 8 is a horizontal section of our improved device, taken in the plane of the line 8—8 of Fig. 2, and partly broken away.

Fig. 9 is a cross-section of our improved device, taken in the plane of the line 9—9 of Fig. 8, and partly broken away.

Fig. 10 is a cross-sectional detail view of our improved device, taken in the plane of the line 10—10 of Fig. 8, and partly broken away.

Fig. 11 is a cross-sectional detail view of our improved device, taken in the plane of the line 11—11 of Fig. 8, and partly broken away; and, Fig. 12 is a cross-sectional detail view of our improved device, taken on the line 12—12 of Fig. 9, and partly broken away.

A casing 21 comprises a stationary section 22 and a rotatable section 23. The stationary section is preferably of inverted bell-like form, shown at 24, in which there is a chamber 25, from which a passage 26 extends. This stationary section is provided with feet 27 arranged to contact the ceiling 28 or other support to which the stationary section is secured, as by bolts 29, to form an air port 30 between the rim 31 of the stationary section and the surface of the support. (See Figs. 1, 2 and 5.)

A hollow sleeve 35 connects the sections of the casing and permits rotation of the rotatable section. (Figs. 2, 5 and 8.) The hollow sleeve is received in bearings 36, 37, in the stationary section and in bearings 38, 39, in the rotatable section. The upper end of the sleeve is screw threaded, as shown at 41, and has a step ball-bearing 42 thereabout, located between a threaded collar 43 on the upper screw threaded end of the sleeve and the bearing 36. The lower end of the sleeve is screw-threaded, as shown at 45, and has a screw-threaded collar 46 thereabout for clamping the bearing 39 between said collar and a shoulder 47 on said sleeve.

There is an annular guideway 48 between proximate ends of said sections. Adjustment of the collar 43 adjusts the rotatable section axially with relation to the stationary section so that the rotatable section has proper rotatable support by means of the sleeve and the mating faces of the annular guideway 48 have proper bearing relation with each other for permitting ready rotation of the rotatable section and avoiding binding between the sections.

Tubes 51, 52, 53, 54, extend in substantially radial directions from the casing, the inner ends of the tubes being rigidly secured to the rotatable casing section. (See Figs. 1, 2, 3 and 8.)

A drive-shaft 61 is rotatable in bearings 62, 63, in the rotatable section, (see Figs. 2, 8 and 9), and has a worm 64 fixed thereon. Driven shafts 65, 66, 67, are rotatable in the tubes 51, 52, 53, the outer ends of said shafts being journaled respectively in bearings 68, 69, 70, at the outer ends of said tubes, (Figs. 1, 2 and 5).

The worm 64 meshes with a worm-wheel 71 fixed to a shaft 656, journaled in bearings 75, 76, in the casing. (See Fig. 2.)

A spiral gear 77 is fixed to the shaft 656 and meshes with a spiral gear 78 fixed to a shaft 671 for rotating the latter shaft from the shaft 656, (Figs. 2 and 5). The shafts 65, 66, are continuations of the shaft 656, being connected therewith by couplings 79, 80. The shaft 67 is a continuation of the shaft 671, being connected therewith by a coupling 81. A spacing sleeve 82 about the shaft 656 spaces the gears 71, 77, from each other.

The drive-shaft 61 is preferably driven by an electric motor 85 supported by the casing, as by means of straps 86 fixed to the tube 54, the latter tube being so fixed to the casing as to prevent rotation thereof, as by means of a pin 87. The motor is coupled to said shaft by a coupling 88. (See Fig. 8.)

The drive connection between the drive-shaft 61 and the shaft 656, namely, the worm 64, and the worm-wheel 71, provides for material reduction in speed of rotation between the drive-shaft and the shaft 656. The speed of rotation of the drive-shaft is high, as it is driven direct from the electric motor, and may be instanced as rotating at 1800 R. P. M., the speed of rotation of the worm-wheel being materially reduced by said drive connection. The latter speed may be instanced as 600-800 R. P. M. The driven shaft 656 is arranged to rotate two of the rotatable tools, for instance an applying tool 91 and a polishing tool 92. The driven shaft 671 is arranged to rotate a further rotating tool, instanced as a rotatable water brush 93.

The speed of rotation of the rotary water brush is advisedly materially less than the speed of rotation of the applying tool and the polishing tool, this reduction in sped being obtained by the spiral gears 77, 78. The desired speeds of rotation for the various rotating tools are obtained in our improved device by very simple and economical means requiring few gears and permitting consequent economy in construction of parts and in assembling.

The shafts 65, 66 and 67, comprise outer flexible sections 96, 97, 98, in flexible casings 101, 102, 103, these flexible shafts and flexible casings being of usual construction. The flexible shafts are connected with the rigid sections of the shafts by usual couplings 104. (See Figs. 1, 2 and 5.)

The outer ends of the flexible shafts are connected with the rotary stems 106, 107, 108, of the respective rotary tools 91, 92, 93, by means of usual couplings 109, (Figs. 2, 4 and 7). These rotary stems are suitably journaled in handles 111, 112, 113, of said respective rotary tools. The rotary tools are suitably releasably connected with the stems by suitable couplings 114, so that the respective tools may be readily removed and replaced.

The tube 54 forms the rigid section of an air-pipe, having an outer flexible section 118, suitably coupled thereto, as by a coupling member 119. (See Figs. 1 and 6.) This outer flexible section may be a suitable rubber hose. An air-tool 120 is secured to the outer end of the flexible section and has communication therewith. This tool may be in the form of a nozzle having an elongated mouth 121, the lips 122 of which may serve as wipers for wiping fluid portions or beads of moisture from the surface of the automobile. This nozzle is preferably of soft yielding rubber to avoid injury to the surface.

A fan 125 is supported by the rotary casing section 23, and may be in the form of a blower, and comprise a housing 126, which may be part of the rotary casing 23, and a rotatable housing section 127, (Figs. 8 to 12). The fan rotor 128 has blades thereon and is fixed to the drive-shaft 61.

The housing 126 of the fan is provided with a passage 131 communicating with the air-pipe 54, (Figs. 10, 11 and 12).

It also has a passage 132 communicating with a vacuum-bag 133, suitably supported by the rotary casing section. It further has a passage 134, communicating with a passage 135, leading to outside the casing or with a passage 136 communicating with the passage 26 and the chamber 25 in the stationary casing section. A valve 138 is located between the passages 135 and 136, so that the source of the air in the passage 134 may be controlled.

The rotary housing section 127 is provided with ports 141, 142, (Figs. 10 and 11). The rotation of the rotary housing section causes these ports to register either with the passages 131, 134, for blowing the air outwardly through the air-pipe 54 and the nozzle 120, or said ports are caused to register with the passages 132, 131, for blowing the air outwardly into the vacuum bag and drawing the air inwardly through the air-pipe 54.

When the fan acts to blow the air outwardly through the air-pipe 54, it draws the air either through the passage 136 and the chamber 25, for purposes hereinafter described, or through the passage 135 communicating with the air outside the casing. The source of the air is controlled by the valve 138. This valve is secured to a rod 143, journaled in suitable bearings in the rotatable casing section, and provided with an arm 144, (Figs. 1, 9 and 12). A slide-rod 145 extends lengthwise of the tube 54, and is slidable in bearings 146 fixed to the tube, and is provided with a handle 147 for manipulating the same. The slide-rod has a bent portion 148 at its inner end provided with a pin 149 received in a slot 150 in the arm 144 for rocking said arm by axial movement of the slide-rod in order to control the position of the valve 138.

Means for rotating or rocking the rotatable housing section of the fan are shown as a rocker-rod 155, having an arm 156 secured thereto, (Figs. 1 and 9). A link 157 is articulated with the arm at 158 at one end of the link, the other end of the link being articulated at 159 with a lug 160 on the rotatable housing section. The rocker-rod 155 is suitably journaled on the air-pipe 54 in suitable bearings secured to said air-pipe, one of which is shown at 161. An operating handle 162 is secured to said rocker-rod for manipulating the rotatable housing section.

A water pipe is arranged to supply water to the rotary cleaning brush 93. This water pipe comprises a coil section 165 in the chamber 25 and a depending section 166 communicating with the coil section, this depending section passing through the hollow sleeve 35, (Figs. 1, 2, 5 and 8). A branch section 167 connects with the depending section by means of a compressible swivel joint 168, the branch section extending along the tube 53, to which it is clamped by means of clamps 169. The depending section is stationary and the branch section rotates with the rotatable section of the casing. The swivel joint permits the feeding of water through the branch section regardless of the radial position of the latter.

At the outer end of the branch section 167 there is a flexible section 170, for instance in the form of a hose, which connects with the branch section by means of a suitable coupling at its inner end and at its outer end connects with the water passage 171 in the handle 113 of the rotary water brush, a suitable valve 172 being located in said passage and operated for instance by a push-button 173, by means of which the operator may regulate the flow of water at the handle for controlling the flow according to the work being performed, (Figs. 1 and 7). The water passage in the handle communicates in suitable manner with water passages 174 in the rotary head of the brush for feeding water between the bristles of the brush.

The feed water may be either of normal temperature or may be tempered, for instance, heated. Thus the supply pipe 177 for the water may have a suitable valve 178 therein. (See Fig. 1.) The supply pipe may have a branch 179 in which there is a valve 180, this branch passing through a suitable water heater 181, in which the water is heated in any usual or well known manner. The fuel may be supplied by a gas pipe 182, in which there is a valve 183. The manipulation of the valves 178, 180, regulates the temperature of the water passing through the water pipe. When hot water passes through the water pipe the chamber 25 is heated so that when the fan is operating and drawing air from said chamber heated air will be supplied at the nozzle 120.

The wiring for the electric motor may comprise wires 185 leading from the motor and connecting with contact fingers 186 on an insulating block 187 secured to the partition 188 of the rotary section of the casing. These fingers contact electro-conductive contact rings 189 secured to an insulating plate 190 fixed to the stationary section of said casing. Wires 191 connect with the contact rings. These wires are in a cable 192 which passes through the passage 26 and the chamber 25 and extends through a usual pipe 193 outside the casing to a suitable point, where a switch 194 is positioned for opening or closing the circuit for the motor (Figs. 2, 5 and 8).

Suitable electric lamps 195 are secured to the outer ends of the tubes 51, 52, 53, 54, respectively. The electric wiring for the respective lamps branch from the wiring connecting with contact fingers 186, (Figs. 1 and 2).

The respective arms are provided with springs 196 at their outer ends, the springs connecting with the respective flexible sections of the tubings for the shafts and the flexible outer pipe section at intermediate points of said flexible sections for aiding in normally maintaining the middle portions of the flexible sections in raised positions, but permitting said flexible sections to be extended by the operator by pulling upon the respective handles of the tools, so as to reach desirable points upon the automobile in treating the latter, (Figs. 1 and 2).

The outer ends of the tubes are also provided with hooks 197 upon which the respective tools or the outer ends of the flexible sections may be hung for suspending the same when not in use, (Figs. 1 and 2).

In employing our improved device, the automobile, represented at 198, is placed in a substantially central position under the casing. The tubes 51, 52, 53, 54, radiate from the casing toward the respective sides and ends of the automobile above the automobile. The automobile is first washed by using the rotary cleaning brush 93 thereon. The temperature of the water is controlled by the water heating means and the valves 178 and 180. The automobile is dried after the washing by means of the nozzle tool 120, the wiping edge 122 of the nozzle tool being first employed to wipe the heavily wet portions of the surface of the automobile, wiping the beads of moisture from said surface, while at the same time a current of air is blown through the nozzle by means of the fan 125. This current of air may be of normal temperature, as when the valve 138 is seated on the port 136, communicating with the chamber 25, and the port 135 communicating with the outside air is open (Figs. 9 and 12), and the movable section 127 of the fan housing is positioned for connecting the ports 141, 142, therein respectively with the channels 131, 134.

If heated air is to be employed in drying the surface of the automobile, the valve 138 is positioned to close the port 135 and open the port 136, whereby the fan draws the air from the heating chamber 25 for blowing it through the air pipe 54.

When the surface of the automobile has been dried, it is provided with a coating of finishing material, for instance wax, as by passing the applying tool or head 91 thereover, this tool rotating as it is moved along the surface of the automobile. The outer periphery of the tool is preferably soft and yielding, the tool being round in cross-section and tapering toward its outer end for forming an outer point 201 which is readily received in sharp corners in the body, so that all portions of the surface of the body may be reached by means of the tool.

When the wax or other finishing medium has been applied, the surface is preferably polished, for which purpose the polishing tool 92 is employed. This polishing tool is preferably round in cross-section and tapers at its outer end to a point 202 so that it too may be received in sharp corners in order that all parts of the surface may be polished. The polishing tool has an outer periphery preferably of soft polishing material. A current of cooling air may be applied to the surface to which the finishing material has been applied, by means of the nozzle 120 to harden the finishing material. This current of cooling air is preferably applied to the surface after the finishing material has been applied thereto and before the polishing takes place.

If it is desired to remove dust or dirt from the interior or exterior of the automobile, the fan is arranged as a suction fan, for drawing or sucking the air through the air-pipe and through the fan into the vacuum-bag 133. This in the present instance is accomplished by manipulating the handle 162 for positioning the rotatable section 127 of the housing of the fan so that the ports therein communicate with the passage 131 connecting with the air-tube 54 and with the passage 132 connecting with the vacuum-bag. The nozzle 120 may with such adjustments be employed as a suction nozzle, or other suitable or usual suction nozzles may be substituted therefor.

If desired, the various tools may be simultaneously employed on different portions of the automobile so that treating of the automobile may be quickly accomplished.

Our improved device enables the time of treating automobiles to be very materially reduced and provides means whereby the treating is accomplished in a short time and with extremely good results.

We do not herein claim the brush head or its connections, the applying head or its connections, or the polishing head or its connections, having shown, described and claimed the same in copending applications in the United States Patent Office Serial No. 370,192, filed June 12, 1929; Serial 373,301, filed June 24, 1929; and Serial No. 373,302, filed June 24, 1929.

Having thus fully described our invention, what we claim as new, and desire to secure by Letters Patent, is:

1. In a device of the character described, the combination of a support including a stationary overhead section and a manually rotatable overhead section, a hollow sleeve whose axis is substantially coincident with the axis of rotation of said rotatable section supporting said rotatable section from said stationary section, said stationary section comprising a chamber, water piping comprising a coil section in said chamber, a section in said hollow sleeve, and a section movable with said rotatable section and connected to the section in the hollow sleeve by a swivel joint permitting said last-named movement, means for heating the water in said piping, whereby to heat said chamber, a blower supported by and moving with said rotatable section and having communication with said chamber for supplying heated air to said blower, and a flexible pipe on said rotatable overhead section having communication with said blower.

2. In a device of the character described, the combination of a support including an upper stationary section and a lower rotatable section, an electric motor mounted on said rotatable section to rotate therewith, a sleeve whose axis is substantially coincident with the axis of rotation of said rotatable section, means for supporting said sleeve in said stationary section, means for supporting said rotatable section by means of said sleeve, a water pipe comprising communicating sections including a section in said stationary section, a section in said sleeve, a horizontally disposed section, a flexible outer section and a swivel joint between said sleeve and said horizontally disposed section, a rotatable tool with which said flexible outer section communicates, a drive-shaft comprising a horizontally disposed section and a flexible outer section having rotative drive connection with said tool, said horizontally disposed sections extending laterally from said lower rotatable section and connected for combined movement with said lower rotatable section, said flexible outer sections connected together, and speed reducing means in said rotatable section arranged about said sleeve so as to rotate with said rotatable section, said speed reducing means having driven connection with said electric motor and drive connection with said horizontally disposed section of said drive-shaft for rotating said tool.

CARL F. SEIBERT.
ELMER J. SEIBERT.